United States Patent
Kikuchi et al.

(10) Patent No.: US 9,937,949 B2
(45) Date of Patent: Apr. 10, 2018

(54) ELECTRIC POWER STEERING SYSTEM

(71) Applicant: JTEKT CORPORATION, Osaka-shi, Osaka (JP)

(72) Inventors: Arata Kikuchi, Soraku-gun (JP); Wataru Yamada, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 14 days.

(21) Appl. No.: 14/975,054

(22) Filed: Dec. 18, 2015

(65) Prior Publication Data

US 2016/0194024 A1 Jul. 7, 2016

(30) Foreign Application Priority Data

Jan. 7, 2015 (JP) .................................. 2015-001709

(51) Int. Cl.

| | |
|---|---|
| *B62D 5/04* | (2006.01) |
| *F16H 1/16* | (2006.01) |
| *F16H 55/22* | (2006.01) |
| *F16H 55/24* | (2006.01) |

(52) U.S. Cl.
CPC .............. *B62D 5/0409* (2013.01); *F16H 1/16* (2013.01); *F16H 55/22* (2013.01); *F16H 55/24* (2013.01)

(58) Field of Classification Search
CPC ............................. B62D 5/0409; F16H 55/24
USPC ............................................ 180/444; 464/73
See application file for complete search history.

(56) References Cited

U.S. PATENT DOCUMENTS

| | | | | |
|---|---|---|---|---|
| 2,417,436 A | * | 3/1947 | Natkins ..................... | F16D 3/68 464/17 |
| 8,091,450 B2 | * | 1/2012 | Manzoor ............. | F16F 15/1428 464/73 |
| 2009/0288905 A1 | | 11/2009 | Park | |
| 2009/0294202 A1 | | 12/2009 | Choi et al. | |

(Continued)

FOREIGN PATENT DOCUMENTS

| | | |
|---|---|---|
| DE | 10 2008 058853 A1 | 11/2009 |
| DE | 10 2008 064416 A1 | 12/2009 |

(Continued)

OTHER PUBLICATIONS

May 6, 2016 Extended European Search Report issued in European Patent Application No. 15201700.0.

(Continued)

*Primary Examiner* — Tony H Winner
(74) *Attorney, Agent, or Firm* — Oliff PLC

(57) ABSTRACT

A power transmission coupling that couples an output shaft of an electric motor and a worm shaft together includes a first rotation element coupled to the output shaft, a second rotation element coupled to the worm shaft, and an intermediate element formed of an elastic body and interposed between the first rotation element and the second rotation element. The intermediate element forms a unit integrally including an annular support portion, power transmission portions extending radially from the support portion and interposed between engaging protrusions of the first rotation element and the second rotation element, a spacer arranged inward of the support portion in a radial direction to apply a preload to the worm shaft in an axial direction, and a coupling portion that couples the support portion and the spacer together.

12 Claims, 5 Drawing Sheets

(56) References Cited

U.S. PATENT DOCUMENTS

| | | | | |
|---|---|---|---|---|
| 2012/0208649 A1* | 8/2012 | Nakagawa | ................ | F16D 3/68 464/73 |
| 2013/0025960 A1* | 1/2013 | Hama | .................. | B62D 5/0409 180/444 |
| 2015/0217804 A1* | 8/2015 | Moriyama | ................ | F16D 3/68 180/444 |
| 2015/0298733 A1* | 10/2015 | Moriyama | ........... | B62D 5/0409 180/444 |

FOREIGN PATENT DOCUMENTS

| | | |
|---|---|---|
| EP | 2 518 358 A1 | 10/2012 |
| EP | 2 559 607 A1 | 2/2013 |
| EP | 2 918 862 A1 | 9/2015 |
| JP | 2008-290693 A | 12/2008 |
| JP | 2009-280191 A | 12/2009 |
| JP | 2009-286387 A | 12/2009 |

OTHER PUBLICATIONS

Aug. 18, 2017 Office Action issued in European Patent Application No. 15201700.0.

\* cited by examiner

ELECTRIC POWER STEERING SYSTEM

INCORPORATION BY REFERENCE

The disclosure of Japanese Patent Application No. 2015-001709 filed on Jan. 7, 2015 including the specification, drawings and abstract, is incorporated herein by reference in its entirety.

BACKGROUND OF THE INVENTION

1. Field of the Invention

The present invention relates to an electric power steering system.

2. Description of Related Art

Various electric power steering systems have been developed in which rotation of an output shaft of an electric motor is transmitted to an input shaft (worm shaft) of a speed reducer via a coupling (see, for example, Japanese Patent Application Publication No. 2008-290693 (JP 2008-290693 A), Japanese Patent Application Publication No. 2009-280191 (JP 2009-280191 A), and Japanese Patent Application Publication No. 2009-286387 (JP 2009-286387 A)).

Couplings in JP 2009-280191 A and JP 2009-286387 A include an annular body portion and a plurality of protruding portions. The body portion has a motor shaft hole in a center thereof. The protruding portions protrude radially from the body portion. An elastic protrusion is formed on each of the protruding portions to apply an urging force to the worm shaft in an axial direction thereof. However, the elastic protrusions are arranged away from a shaft center of the worm shaft, leading to a high moment load.

Thus, a spacer may be interposed between the worm shaft and the motor shaft to urge the shaft center of the worm shaft in an axial direction thereof, and arranged in the body portion of the coupling.

However, in this case, assembly of the electric power steering system needs an operation of assembling the two components, the coupling and the spacer, to the system. This may hinder the electric power steering system from being easily and efficiently assembled.

SUMMARY OF THE INVENTION

An object of the present invention is to provide an electric power steering system that can be easily and efficiently assembled.

An electric power steering system in an aspect of the present invention includes an electric motor with an output shaft, a speed reducer including a worm shaft arranged coaxially with the output shaft to transmit rotation of the output shaft to a steering shaft, and a power transmission coupling that allows a torque to be transmitted between the output shaft and the worm shaft. The power transmission coupling includes a first rotation element coupled to the output shaft, a second rotation element coupled to the worm shaft, and an intermediate element formed of an elastic body and interposed between the first rotation element and the second rotation element to couple the first rotation element and the second rotation element together so as to allow a torque to be transmitted between the first rotation element and the second rotation element. The first rotation element and the second rotation element each include a plurality of engaging protrusions extending in an axial direction. The engaging protrusions are alternately arranged in a rotating direction. The intermediate element forms a unit integrally including an annular support portion, power transmission portions extending radially from the support portion and each interposed between corresponding engaging protrusions of the first rotation element and the second rotation element, a spacer arranged inward of the support portion in a radial direction and elastically compressed between facing surfaces of the output shaft and the worm shaft to apply a preload to the worm shaft in the axial direction, and at least one coupling portion that couples the support portion and the spacer together.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
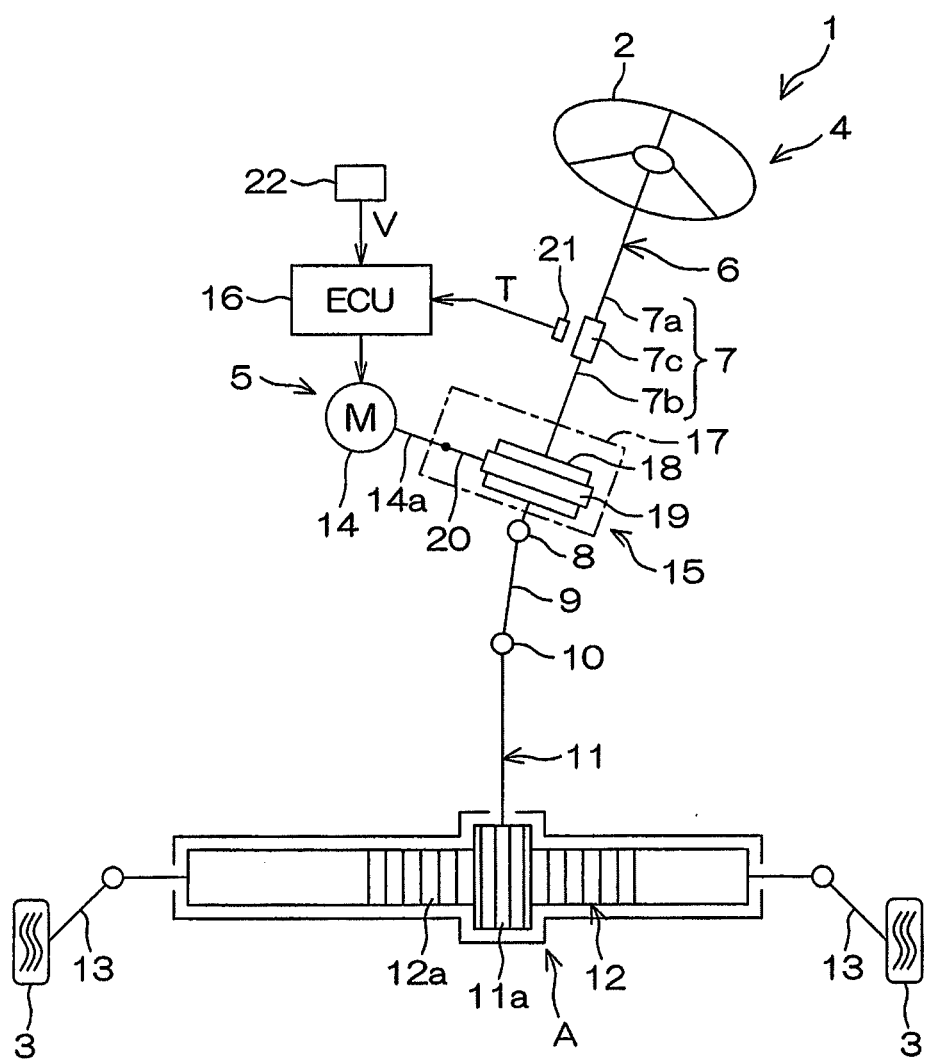
FIG. 1 is a schematic diagram of an electric power steering system in an embodiment of the present invention.

An embodiment of the present invention will be described below in accordance with the drawings. FIG. 1 is a schematic diagram depicting a general configuration of an electric power steering system according to the embodiment of the present invention. As depicted in FIG. 1, an electric power steering system 1 includes a steering mechanism 4 and an assist mechanism 5. The steering mechanism 4 allows steered wheels 3 to be steered based on an operation performed on a steering wheel 2 (steering member) by a driver. The assist mechanism 5 assists the steering operation of the driver.

The steering mechanism 4 includes a steering shaft 6 serving as a rotating shaft of the steering wheel 2. The steering shaft 6 includes a column shaft 7, an intermediate shaft 9, and a pinion shaft 11. The column shaft 7 is coupled to a center of the steering wheel 2. The intermediate shaft 9 is coupled to one end (a lower end in an axial direction) of the column shaft 7 via a universal joint 8. The pinion shaft 11 is coupled to one end (a lower end in the axial direction) of the intermediate shaft 9 via a universal joint 10.

The column shaft 7 includes an input shaft 7a, an output shaft 7b, and a torsion bar 7c. The input shaft 7a is coupled to the steering wheel 2. The output shaft 7b is coupled to the intermediate shaft 9. The torsion bar 7c coaxially couples the input shaft 7a and the output shaft 7b together. A pinion 11a is provided at a lower end of the pinion shaft 11 in the axial direction. The steering mechanism 4 includes a rack shaft 12 on which a rack 12a meshing with the pinion 11a is formed. The pinion 11a and the rack 12a form a rack-and-pinion mechanism A that is a motion conversion mechanism.

When the steering shaft 6 rotates in conjunction with the driver's steering operation, the resultant rotary motion is converted, via the rack-and-pinion mechanism A, into a reciprocating linear motion of the rack shaft 12 in the axial direction thereof. The reciprocating linear motion of the rack shaft 12 is transmitted to the steered wheels 3 via tie rods 13 coupled to opposite ends of the rack shaft 12. This changes the steered angle of the steered wheels 3 and thus the traveling direction of the vehicle.

The assist mechanism 5 includes an electric motor 14, a worm speed reducer 15 serving as a speed reducer, an electronic control unit (ECU) 16 that controls an operation of the electric motor 14. The electric motor 14 applies an assist torque to the column shaft 7. The worm speed reducer 15 transmits rotation of the electric motor 14 to the column shaft 7. The ECU 16 controls the operation of the electric motor 14. The worm speed reducer 15 includes a housing 17, a worm shaft 18, a worm wheel 19, and a power transmission coupling 20. The worm wheel 19 meshes with the worm shaft 18. The power transmission coupling 20 couples an output shaft 14a of the electric motor 14 and the worm shaft 18 together so as to allow a torque to be transmitted between the output shaft 14a and the worm shaft 18. The worm shaft 18, the worm wheel 19, and the power transmission coupling 20 are housed in the housing 17.

Rotation of the electric motor 14 is transmitted to the column shaft 7 via the worm speed reducer 15 to apply a motor torque to the steering shaft 6. Thus, the steering operation is assisted. The electric power steering system 1 is also provided with a torque sensor 21 that detects a steering torque T that is a torque applied to the steering shaft 6 during the steering operation by the driver, based on a relative rotation between the input shaft 7a and the output shaft 7b of the column shaft 7. On the other hand, the vehicle is provided with a vehicle speed sensor 22 that detects a vehicle speed V (the traveling speed of the vehicle).

The ECU 16 sets a target assist force based on the detected steering torque T and the detected vehicle speed V. The ECU 16 feedback-controls a current supplied to the electric motor 14 such that the assist torque applied to the column shaft 7 by the electric motor 14 is equal to a target assist torque. The present embodiment will be described with reference to an example where the electric power steering system 1 is of what is called a column assist type in which the electric motor 14 applies power to the column shaft 7. However, the present invention is not limited to this but may be applied to a pinion-assist electric power steering system in which the electric motor applies power to the pinion shaft.

Figure 2:
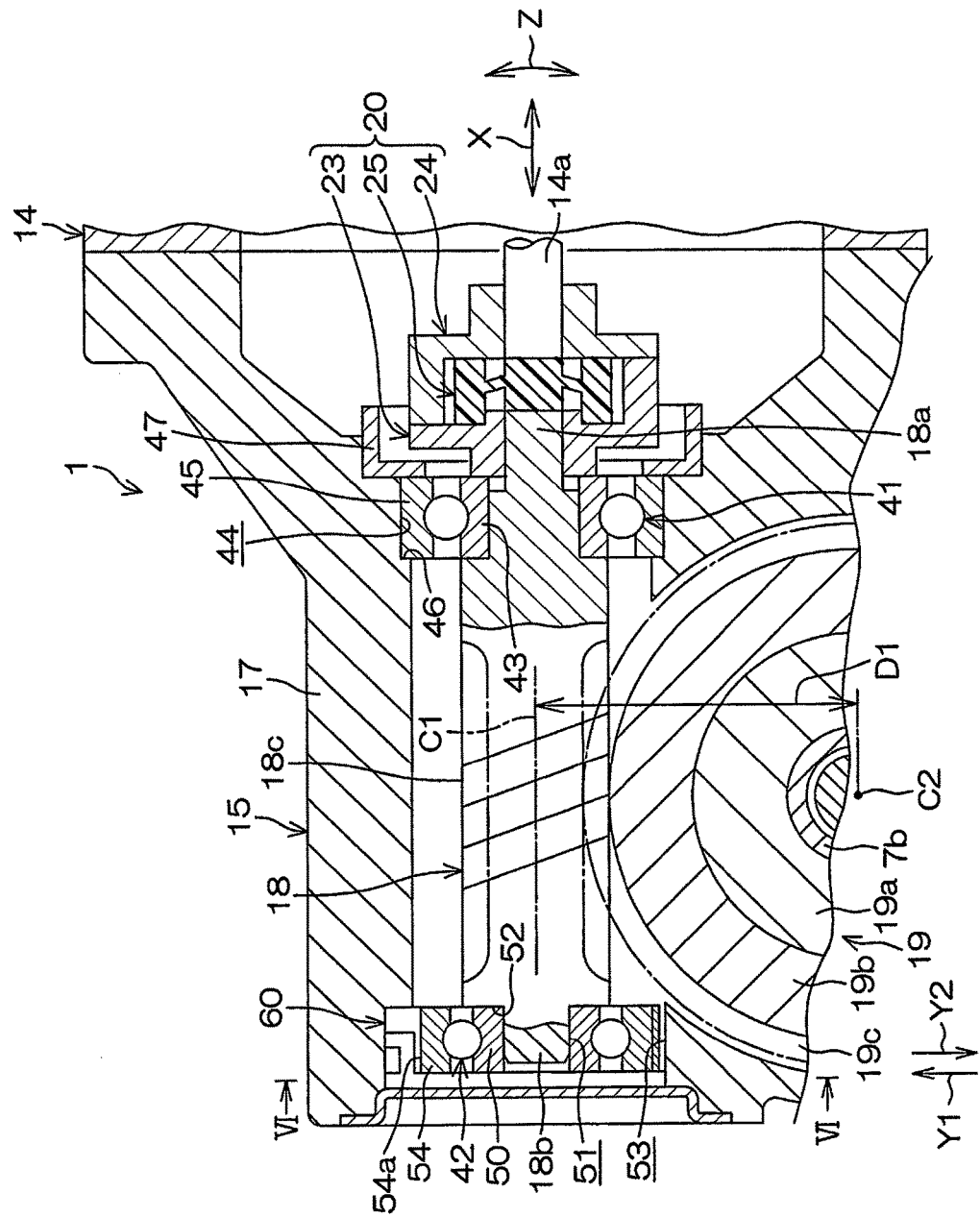
FIG. 2 is a sectional view of an important part of the electric power steering system.

As depicted in FIG. 2, the worm shaft 18 is arranged coaxially with the output shaft 14a of the electric motor 14. The output shaft 14a and the worm shaft 18 face each other in an axial direction X. That is, an end of the output shaft 14a faces an end of the worm shaft 18 in the axial direction X. The worm shaft 18 has a first end 18a and a second end 18b located away from each other in its axial direction and a tooth portion 18c that is an intermediate portion between the first end 18a and the second end 18b.

The worm wheel 19 is coupled to an intermediate portion of the output shaft 7b of the column shaft 7 in the axial direction so as to be rotatable together with the output shaft 7b and to be immovable in the axial direction. The worm wheel 19 includes an annular core 19a and a resin member 19b. The core 19a is coupled to the output shaft 7b so as to be rotatable together with the output shaft 7b. The resin member 19b surrounds the core 19a and has a tooth portion 19c on its outer periphery. The core 19a is, for example, inserted into a mold when resin is molded into the resin member 19b.

The first end 18a of the worm shaft 18 and an end of the output shaft 14a of the electric motor 14 that faces the first end 18a are coupled together via the power transmission coupling 20 so as to allow a torque to be transmitted between the worm shaft 18 and the output shaft 14a and so as to be able to pivot relative to each other. Specifically, the power transmission coupling 20 includes a first rotation element 23, a second rotation element 24, and an intermediate element formed of an elastic body. The first rotation element 23 is fixed to the first end 18a of the worm shaft 18 so as to be rotatable together with the worm shaft 18. The second rotation element 24 is fixed to the output shaft 14a of the electric motor 14 so as to be rotatable together with the electric motor 14. The intermediate element 25 is interposed between the first rotation element 23 and the second rotation element 24 to allow a torque to be transmitted between the first and second rotation elements 23 and 24.

Figure 3:
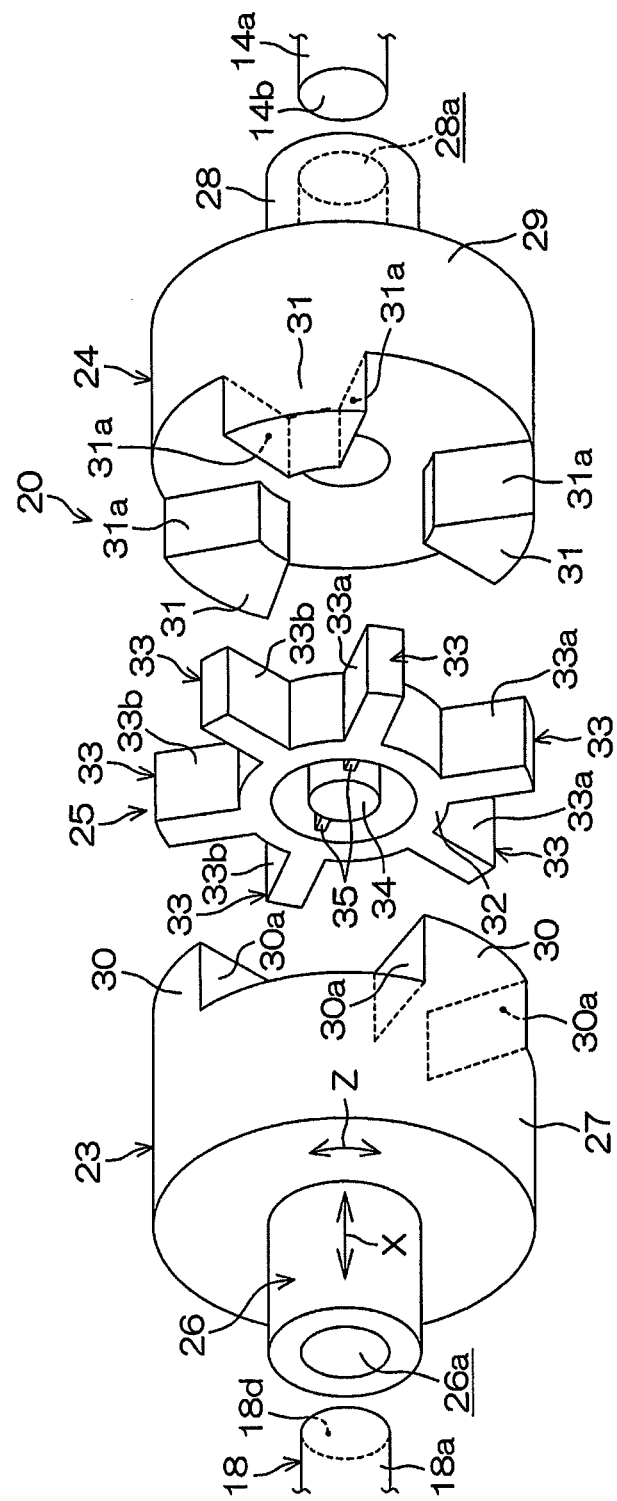
FIG. 3 is an exploded perspective view of a power transmission coupling.
Figure 4:
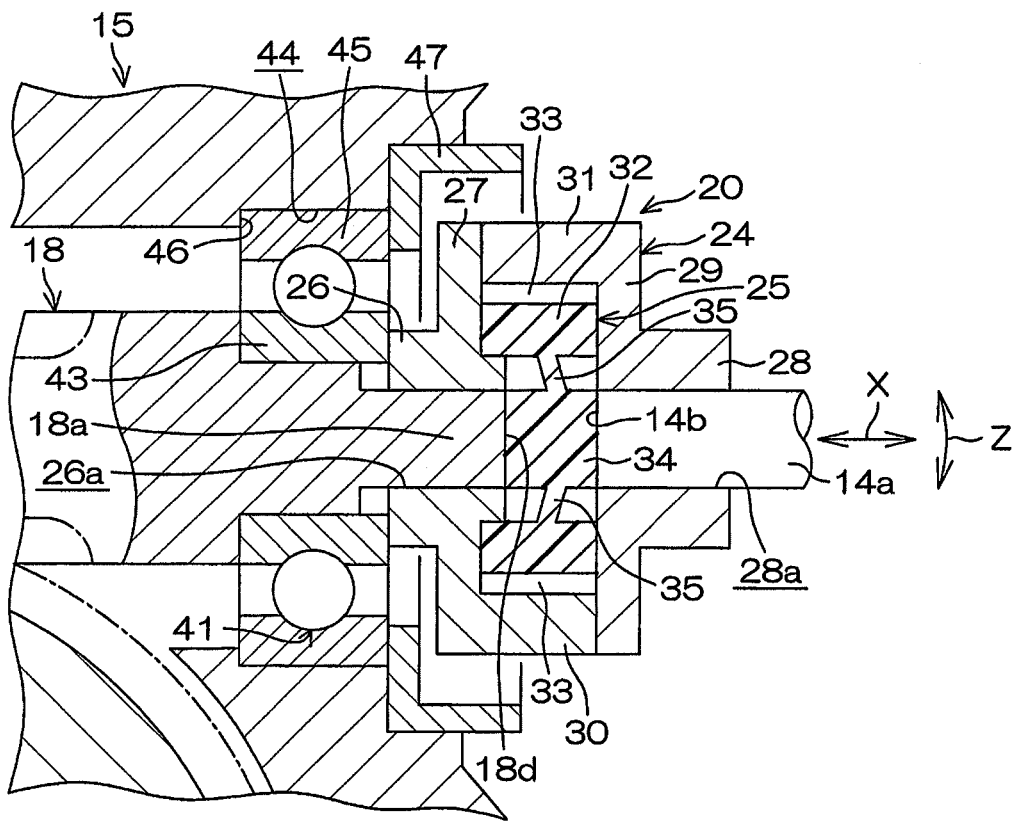
FIG. 4 is an enlarged sectional view of a structure around the power transmission coupling, corresponding to a partially enlarged view of FIG. 2.

As depicted in FIG. 3 and FIG. 4 in which an important part in FIG. 2 is enlarged, the first rotation element 23 includes a boss 26 and an annular flange 27. A fitting hole 26a is formed in the boss 26 such that the first end 18a of the worm shaft 18 is press-fitted into the fitting hole 26a. The flange 27 extends outward from the boss 26 in a radial direction. The boss 26 is fitted over the first end 18a of the worm shaft 18 so as to be rotatable together with the worm shaft 18 and to be immovable in the axial direction. The second rotation element 24 includes a boss 28 and an annular flange 29. A fitting hole 28a is formed in the boss 28 such that the output shaft 14a of the electric motor 14 is press-fitted into the fitting hole 28a. The flange 29 extends outward from the boss 28 in the radial direction. The flange 27 of the first rotation element 23 and the flange 29 of the second rotation element 24 face each other in the axial direction X.

The flange 27 of the first rotation element 23 is provided with a plurality of engaging protrusions 30 arranged at regular intervals in a rotating direction Z (corresponding to a circumferential direction) and protruding in the axial direction X toward the flange 29 of the second rotation element 24. The flange 29 of the second rotation element 24 is provided with a plurality of engaging protrusions 31 arranged at regular intervals in the rotating direction Z (corresponding to a circumferential direction) and protruding in the axial direction X toward the flange 27 of the first rotation element 23. The engaging protrusions 30 of the first rotation element 23 and the engaging protrusions 31 of the second rotation element 24 are alternately arranged in the rotating direction Z (circumferential direction).

The intermediate element 25 includes an annular support portion 32, a plurality of arm-like power transmission portions 33, a spacer 34, and at least one coupling portion 35. The power transmission portions 33 extend radially from the support portion 32. The spacer 34 is arranged inward of the support portion 32 in the radial direction. The coupling portion 35 couples the support portion 32 and the spacer 34 together. The intermediate element 25 is a unit integrally formed of a single material (for example. a rubber material such as urethane rubber).

As depicted in FIG. 3, each of the power transmission portions 33 is interposed between the corresponding engaging protrusions 30 and 31 of the first rotation element 23 and the second rotation element 24. Each of the power transmission portions 33 includes a pair of power transmission surfaces 33a and 33b engaging with power transmission surfaces 30a and 31a of the corresponding engaging protrusions 30 and 31 of the first rotation element 23 and the second rotation element 24. The spacer 34 functions to apply a preload to the worm shaft 18 in the axial direction X by being elastically compressed between facing surfaces 14b and 18d of the output shaft 14a and the worm shaft 18. The spacer 34 is, for example, a cylindrical member and is arranged concentrically with the support portion 32.

Figure 5:
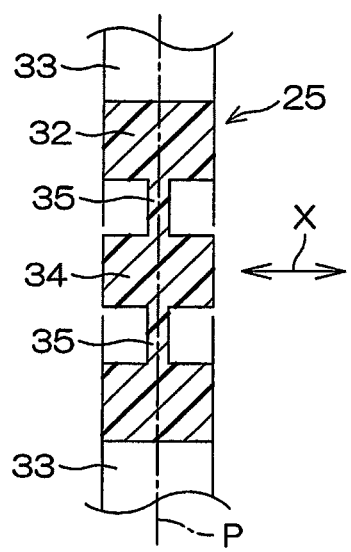
FIG. 5 is a schematic sectional view of an intermediate element.

As depicted in FIG. 5, the intermediate element 25 has, in its free state, a symmetric shape with respect to a plane P that is perpendicular to an axis of the support portion 32. As depicted in FIG. 4, when the intermediate element 25 is assembled, the support portion 32 and the spacer 34 are arranged offset from each other in the axial direction X. That is, the coupling portion 35 couples the support portion 32 and the spacer 34 together so as to permit the support portion 32 and the spacer 34 to be displaced relative to each other in the axial direction X.

As seen in FIG. 2, the first end 18a of the worm shaft 18 is rotatably supported by the housing 17 via a first bearing 41. The second end 18b of the worm shaft 18 is rotatably supported by the housing 17 via a second bearing 42. The intermediate element 25 of the power transmission coupling 20, which is formed of an elastic body, is elastically deformed to permit the worm shaft 18 to pivot with respect to the output shaft 14a of the electric motor 14 around a bearing center of the first bearing 41.

The first bearing 41 and the second bearing 42 are formed of, for example, ball bearings. The first bearing 41 includes an inner ring 43 and an outer ring 45. The inner ring 43 is fitted over the first end 18a of the worm shaft 18 so as to be rotatable together with the worm shaft 18. The outer ring 45 is fixed in a bearing hole 44 formed in the housing 17. The outer ring 45 is sandwiched in the axial direction between a positioning step portion 46 provided at an end of the bearing hole 44 and a locking member 47 screwed to a threaded portion formed in the bearing hole 44. Thus, movement of the outer ring 45 in the axial direction is regulated.

An inner ring 50 of the second bearing 42 is fitted in a fitting recess portion 51 formed in an outer periphery of the second end 18b of the worm shaft 18 so as to be rotatable together with the worm shaft 18. One end surface of the inner ring 50 is in abutting contact with a positioning step portion 52 provided on an outer periphery of the second end 18b. This regulates movement of the inner ring 50 with respect to the worm shaft 18 in the axial direction. A bearing hole 53 is formed in the housing 17 to hold the second bearing 42. The bearing hole 53 is formed as a bias hole that holds the second bearing 42 such that the second bearing 42 can be biased in directions Y1 and Y2 in which a center distance D1 between the worm shaft 18 and the worm wheel 19 (corresponding to the distance between a rotating center C1 of the worm shaft 18 and a rotating center C2 of the worm wheel 19) increases and decreases (the center distance increases in the direction Y1 and decreases in the direction Y2).

Figure 6:
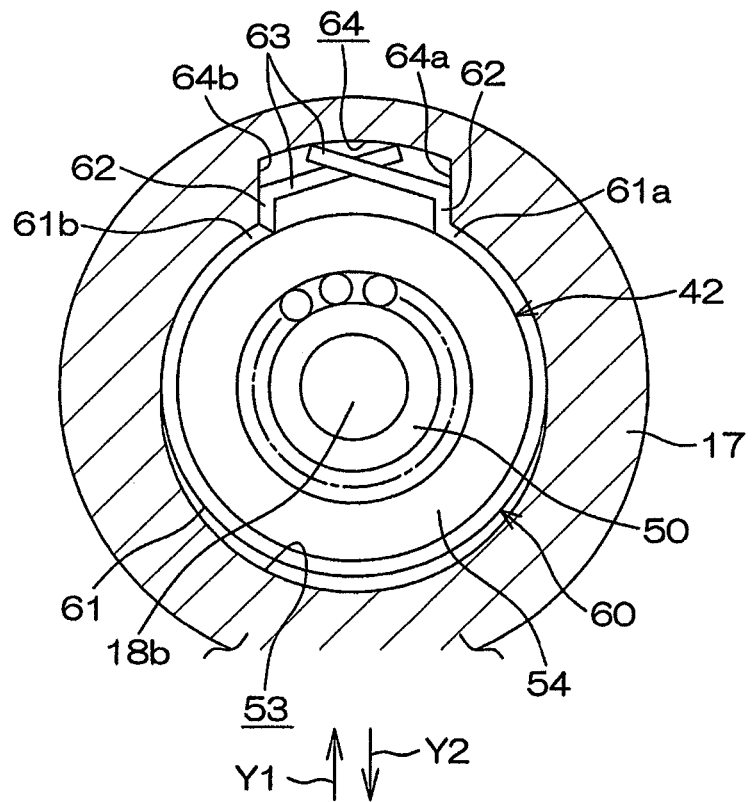
FIG. 6 is a schematic sectional view taken along line VI-VI in FIG. 2, depicting a structure that supports a second end of a worm shaft.

An urging member 60 that is, for example, an annular leaf spring is interposed between an inner periphery of the bearing hole 53 and the outer ring 54 of the second bearing 42. The urging member 60 urges the second bearing 42 in the direction Y2 in which the center distance D1 decreases. The urging member 60 is a thin-plate-like member formed, for example, by sheet metal working. As seen in FIG. 6 that is a sectional view taken along line VI-VI in FIG. 2 and FIG. 7 that is a perspective view, the urging member 60 includes an ended, annular main body portion 61, a pair of rotation regulating portions 62, and a pair of cantilever-like elastic tongue pieces 63. The main body portion 61 surrounds an outer periphery 54a of the outer ring 54 of the second bearing 42. The rotation regulating portions 62 respectively extend from and bend with respect to a first end 61a and a second end 61b that are ends of the main body portion 61 in a circumferential direction thereof. The elastic tongue pieces 63 respectively extend from and bend with respect to the rotation regulating portions 62.

Figure 7:
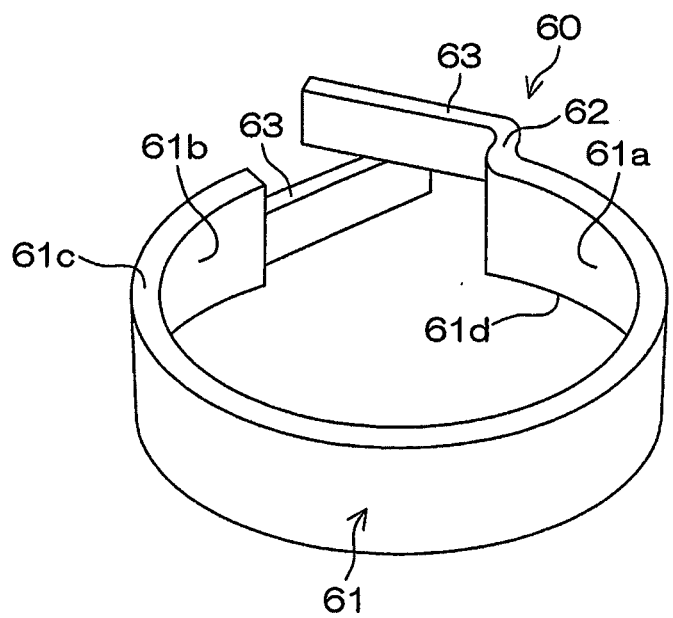
FIG. 7 is a schematic perspective view of a leaf spring serving as an urging member for eliminating possible backlash of a worm speed reducer.

Each of the rotation regulating portions 62 is smaller in width than the main body portion 61. The main body portion 61 is frictionally engaged with and held by an inner periphery of the bearing hole 53 in the housing 17. As depicted in FIG. 7, one of the elastic tongue pieces 63 is arranged on a first side edge 61c side. The other elastic tongue piece 63 is arranged on a second side edge 61d side. The elastic tongue pieces 63 are staggered. As seen in FIG. 6, a receiving recess portion 64 is formed in a part of an inner periphery of the bearing hole 53 in the housing 17 so as to be recessed in a direction (the direction Y1 in which the center distance D increases) opposite to a direction toward the worm wheel 19 with respect to the second bearing 42 (the direction Y2 in which the center distance D decreases). Tips of the elastic tongue pieces 63 of the urging member 60 are received by the bottom of the receiving recess portion 64 of the bearing hole 53. Urging forces of the elastic tongue pieces 63 urge the second end 18b of the worm shaft 18 via the second bearing 42 in the direction Y2 in which the center distance D1 decreases.

The receiving recess portion 64 has a pair of inner walls 64a and 64b facing each other in the rotating direction Z (circumferential direction) of the bearing hole 53. The rotation regulating portions 62 of the urging member 60 are in abutting contact with the corresponding inner walls 64a and 64b. This regulates rotation of the urging member 60 in the rotating direction Z (circumferential direction) of the bearing hole 53. In the present embodiment, in the intermediate element 25 of the power transmission coupling 20, the spacer 34 arranged inward of the annular support portion 32 in the radial direction to apply a preload to the worm shaft 18 in the axial direction X is coupled to the support portion 32 via the coupling portion 35 as depicted in FIG. 3. Thus, the intermediate element 25 forms an integral unit including the spacer 34. Therefore, it is possible to more easily and efficiently assemble the electric power steering system compared to the case in which the spacer 34 is separated from the intermediate element 25.

As depicted in FIG. 4, the support portion 32 and the spacer 34 are arranged offset from each other to enable an increase in the degree of freedom in design of peripheral components. For example, a length over which the boss 26 of the first rotation element 23 is fitted over the first end 18a of the worm shaft 18 can be increased. Furthermore, as depicted in FIG. 5, the intermediate element 25 has, in its free state, a symmetric shape with respect to the plane P that is perpendicular to the axis of the support portion 32. The coupling portion 35 couples the support portion 32 and the spacer 34 together so as to permit the support portion 32 and the spacer 34 to be displaced relative to each other in the axial direction X. The intermediate element 25 can be assembled regardless of the axial direction X, allowing the electric power steering system to be assembled as easily and efficiently as possible.

The intermediate element 25 is a unit integrally formed of a single material. Thus, manufacturing costs are reduced. The present invention is not limited to the above-described embodiment. For example, although not depicted in the drawings, even if the coupling portion 35 is partly broken during assembly, the coupling portion 35 poses no functional problem after the assembly. That is, the rupture strength of the coupling portion 35 and the like need not be taken into account, and thus, the degree of freedom in design of the intermediate element 25 is increased as much as possible.

In the intermediate element 25, a material forming the spacer 34 may be different from materials forming the support portion 32 and the power transmission portions 33. For example, the material forming the spacer 34 may be lower in hardness than the material forming the power transmission portions 33. In this case, the power transmission portions 33 with a relatively high hardness fulfill an appropriate torque transmission function, whereas the spacer 34 with a relatively low hardness fulfills an appropriate preload function.

For example, a first gate and a second gate may be provided in a mold in which the intermediate element 25 is injection-molded, so that the power transmission portions 33 and the spacer 34 are simultaneously molded. The first gate is connected to a cavity for formation of the power transmission portions such that a first resin material is injected into the cavity for formation of the power transmission portions through the first gate. The second gate is connected to a cavity for formation of the spacer such that a second resin material is injected into the cavity for formation of the spacer through the second gate. In this case, the coupling portion 35 may be formed of either the first resin material or the second resin material.

Various modifications may be made to the present invention within the scope of the claims.

What is claimed is:

1. An electric power steering system comprising:
   an electric motor with an output shaft;
   a speed reducer including a worm shaft arranged coaxially with the output shaft to transmit rotation of the output shaft to a steering shaft; and
   a power transmission coupling that allows a torque to be transmitted between the output shaft and the worm shaft,
   wherein:
     the power transmission coupling includes a first rotation element coupled to the output shaft, a second rotation element coupled to the worm shaft, and an intermediate element formed of an elastic body and interposed between the first rotation element and the second rotation element to couple the first rotation element and the second rotation element together so as to allow a torque to be transmitted between the first rotation element and the second rotation element,
     the first rotation element and the second rotation element each include a plurality of engaging protrusions extending in an axial direction, and the engaging protrusions are alternately arranged in a rotating direction,
     the intermediate element forms a unit integrally including an annular support portion, power transmission portions extending radially from the support portion and each interposed between corresponding engaging protrusions of the first rotation element and the second rotation element, a spacer arranged inward of the support portion in a radial direction and elastically compressed between facing surfaces of the output shaft and the worm shaft to apply a preload to the worm shaft in the axial direction, and at least one coupling portion that couples the support portion and the spacer together,
     a width of the spacer is greater than a width of the coupling portion, and
     a width of the annular support portion is greater than the width of the spacer.

2. The electric power steering system according to claim 1, wherein the support portion and the spacer are arranged offset from each other in the axial direction.

3. The electric power steering system according to claim 2, wherein the intermediate element has, in its free state, a symmetric shape with respect to a plane that is perpendicular to an axis of the support portion, and
   the coupling portion couples the support portion and the spacer together so as to permit the support portion and the spacer to be displaced relative to each other in the axial direction.

4. The electric power steering system according to claim 3, wherein the intermediate element is integrally formed of a single material.

5. The electric power steering system according to claim 4, wherein a part of the coupling portion is broken.

6. The electric power steering system according to claim 3, wherein a part of the coupling portion is broken.

7. The electric power steering system according to claim 2, wherein the intermediate element is integrally formed of a single material.

8. The electric power steering system according to claim 7, wherein a part of the coupling portion is broken.

9. The electric power steering system according to claim 2, wherein a part of the coupling portion is broken.

10. The electric power steering system according to claim 1, wherein the intermediate element is integrally formed of a single material.

11. The electric power steering system according to claim 10, wherein a part of the coupling portion is broken.

12. The electric power steering system according to claim 1, wherein a part of the coupling portion is broken.

* * * * *